United States Patent
Bystrov et al.

(10) Patent No.: US 9,542,012 B2
(45) Date of Patent: Jan. 10, 2017

(54) SYSTEM AND METHOD FOR PROCESSING A POINTER MOVEMENT

(71) Applicant: KONINKLIJKE PHILIPS N.V., Eindhoven (NL)

(72) Inventors: Daniel Bystrov, Hamburg (DE); Rafael Wiemker, Kisdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/380,735

(22) PCT Filed: Jan. 28, 2013

(86) PCT No.: PCT/IB2013/050712
§ 371 (c)(1),
(2) Date: Aug. 25, 2014

(87) PCT Pub. No.: WO2013/124751
PCT Pub. Date: Aug. 29, 2013

(65) Prior Publication Data
US 2015/0035753 A1    Feb. 5, 2015

Related U.S. Application Data

(60) Provisional application No. 61/602,756, filed on Feb. 24, 2012.

(51) Int. Cl.
G06F 3/033    (2013.01)
G06F 3/0354   (2013.01)
(Continued)

(52) U.S. Cl.
CPC .......... *G06F 3/03543* (2013.01); *G06F 3/038* (2013.01); *G06F 3/0383* (2013.01); *G06F 3/04812* (2013.01)

(58) Field of Classification Search
USPC ........................................................ 345/157
See application file for complete search history.

(56) References Cited

U.S. PATENT DOCUMENTS 8,013,837 B1 *   9/2011   Schroeder ............... G06F 3/011
                                                        345/157
2008/0139895 A1   6/2008   Baumgart
2015/0035753 A1   2/2015   Bystrov et al.

FOREIGN PATENT DOCUMENTS

EP    0714057 A1    5/1996
EP    2385451 A1    9/2011
(Continued)

OTHER PUBLICATIONS

Barrett, W.A. et al. "Interactive Live-Wire Boundary Extraction", Medical Image Analysis, 1(4):331-341, 1997.
(Continued)

*Primary Examiner* — Gustavo Polo

(57) ABSTRACT

A system 100 for real-time processing of a pointer movement provided by a pointing device, the system comprising an output 130 for displaying a pointer 162, 164 at a first position $p_1$ in an image 152, 154, 156, the image comprising a contour; a user input 110 for obtaining pointer movement data 112 from a pointing device 140 operable by a user, the pointer movement data being indicative of a pointer movement v of the pointer from the first position to a second position $p_2$ in the image; and a processor 120 for (i) dampening the pointer movement by reducing the pointer movement along a direction orthogonal 172 to the contour, and (ii) establishing a third position $p_3$ of the pointer based on said dampened pointer movement $v_d$.

19 Claims, 5 Drawing Sheets

(51) Int. Cl.
*G06F 3/038* (2013.01)
*G06F 3/0481* (2013.01)

(56) References Cited

FOREIGN PATENT DOCUMENTS

| | | |
|---|---|---|
| WO | 2005048193 A1 | 5/2005 |
| WO | 2010038172 A1 | 4/2010 |

OTHER PUBLICATIONS

Elliott, P.J. et al. "Interactive image segmentation for radiation treatment planning". IBM Systems Journal, vol. 31, No. 4(1992).
Mortensen, E.N. et al. "Interactive segmentation with Intelligent Scissors". Graphical Models and Image Processing, vol. 60, Issue 5, Sep. 1998, pp. 349-384.

* cited by examiner

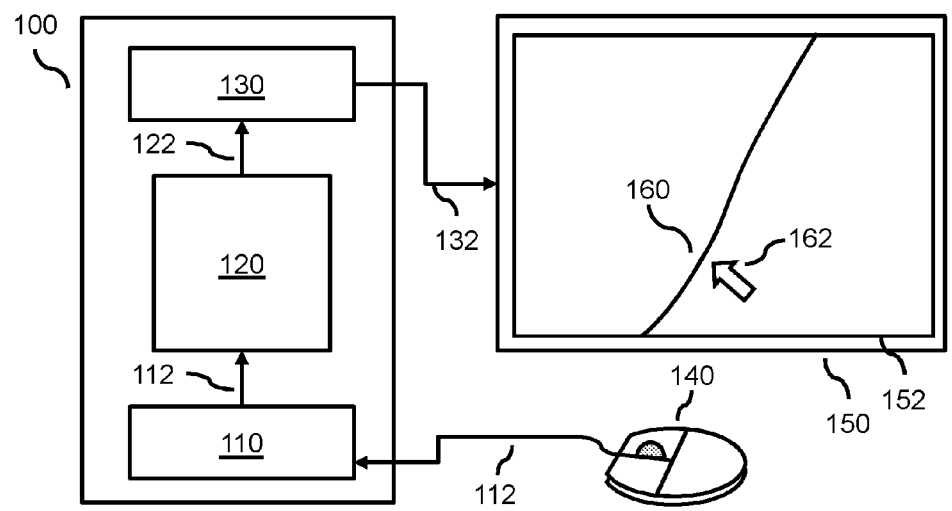
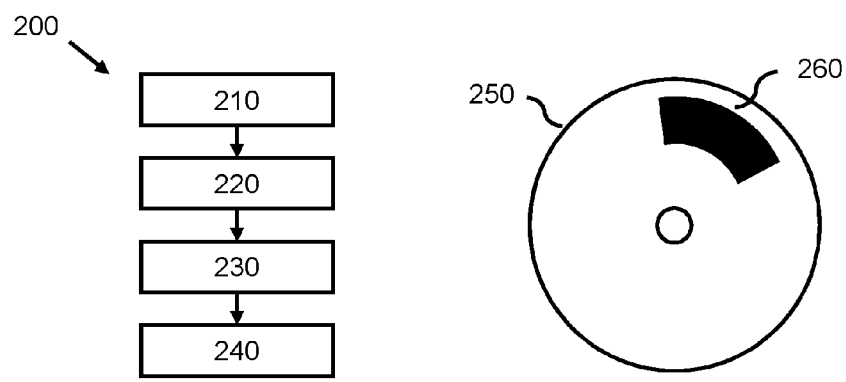
Fig. 1
Fig. 2
Fig. 3

SYSTEM AND METHOD FOR PROCESSING A POINTER MOVEMENT

CROSS-REFERENCE TO PRIOR APPLICATIONS

This application is the U.S. National Phase application under 35 U.S.C. §371 of International Application No. PCT/IB2013/050712, filed on Jan. 28, 2013, which claims the benefit of U.S. Provisional Application No. 61/602,756, filed on Feb. 24, 2012. These applications are hereby incorporated by reference herein.

FIELD OF THE INVENTION

The invention relates to a system and method for real-time processing of a pointer movement provided by a pointing device. The invention further relates to a workstation and an imaging apparatus comprising said system, and a computer program product comprising instructions for causing a processor system to perform said method.

A pointing device, such as a computer mouse, touch screen, stylus, etc., enables a user to interact with apparatuses such as computers, tablets, etc. Said interaction may involve the use of a graphical user interface, wherein a position or movement of the pointing device is represented onscreen by a pointer or cursor being positioned and/or moved accordingly. In this manner, an intuitive way of interacting with the device is provided.

BACKGROUND OF THE INVENTION

Systems and methods are known that enable users to operate a pointing device to perform processing of an image using the pointer shown onscreen. For example, the user may draw a line or curve in the image by moving the pointing device accordingly.

In particular, it is known to facilitate the drawing of boundaries in medical images. A publication "*Interactive Live-Wire Boundary Extraction*", by W. A. Barrett et al., Medical Image Analysis, 1(4):331-341, 1997, describes a tool which is said to allow accurate boundary extraction requiring minimal user input. Optimal boundaries are computed and selected at interactive rates as the user moves a mouse starting from a manually specified seed point. When the mouse position comes in proximity to an object edge, a "live-wire" boundary snaps to, and warps around the object of interest. It is noted that in order to facilitate seed point placement, a cursor snap is available which forces the mouse pointer to the maximum gradient magnitude pixel within a user specified neighborhood.

A problem of the above tool is that snapping the mouse pointer to a particular pixel in the image to establish a position in the image is inconvenient for a user.

SUMMARY OF THE INVENTION

It would be advantageous to have a system or method for enabling a user to more conveniently establish a position in the image using a pointing device.

To better address this concern, a first aspect of the invention provides a system for real-time processing of a pointer movement provided by a pointing device, the system comprising:
an output for displaying a pointer at a first position in an image, the image comprising a contour;
a user input for obtaining pointer movement data from a pointing device operable by a user, the pointer movement data being indicative of a pointer movement of the pointer from the first position to a second position in the image; and
a processor for (i) dampening the pointer movement by reducing the pointer movement along a direction orthogonal to the contour, and (ii) establishing a third position of the pointer based on said dampened pointer movement.

In a further aspect of the invention, a workstation and an imaging apparatus are provided comprising the system set forth.

In a further aspect of the invention, a method is provided for real-time processing of a pointer movement provided by a pointing device, the method comprising:
displaying a pointer at a first position in an image, the image comprising a contour;
obtaining pointer movement data from a pointing device operable by a user, the pointer movement data being indicative of a pointer movement of the pointer from the first position to a second position in the image;
dampening the pointer movement by reducing the pointer movement along a direction orthogonal to the contour; and
establishing a third position of the pointer based on said dampened pointer movement.

In a further aspect of the invention, a computer program product is provided comprising instructions for causing a processor system to perform the method set forth.

The above measures provide real-time processing of a pointer movement provided by a pointing device. Here, real-time refers to the pointer movement being processed while the user operates the pointing device, i.e., at so-termed interactive rates. The system comprises an output such as a display or display output which enables display of a pointer at a first position in an image, e.g., by overlaying the pointer over the image. The pointer is a graphical indicator such as an arrow or crosshair, also commonly referred to as a cursor. As a result, the pointer is visible to the user when viewing the image onscreen. The first position of the pointer may reflect a physical position of the pointing device or a physical position of the user with respect to the pointing device at a first instance in time, e.g., a position of a finger of the user relative to a surface of a touchscreen.

The system further comprises a user input that obtains pointer movement data from the pointing device when the user operates the pointing device. The pointer movement data is indicative of a movement of the pointer from the first position to a second position in the image, and thus allows the system to establish the second position. The pointer movement may reflect a physical movement of the pointing device or of the user with respect to the pointing device, e.g., a movement of the finger of the user on the touch-screen.

The image comprises a contour. The contour is formed by elements of the image such as pixels or voxels. The contour may be an edge, i.e., a clear boundary between two objects or an object and its background. The contour may also be formed by pixels or voxels having the same or similar value, e.g., a line in a texture area or along an image gradient, e.g., being conceptually similar to a height contour line in a topographical map. It is noted that the contour may be an open contour, i.e., having a start and an end which are not connected, as well as a closed contour, i.e., being a contour that connects with itself.

The system further comprises a processor that reduces the pointer movement in a direction that is perpendicular to the orientation or direction of the contour in the image.

Hence, a part, i.e. a component, of the pointer movement which is directed towards and/or away from the contour is reduced. As a result, a dampened pointer movement is obtained, which is used to establish a third position of the pointer. The third position therefore corresponds with the pointer's dampened movement from the first position. As a result, the third position typically differs from the second position.

The above measures have the effect that a movement of the pointer, as provided by the user, is reduced in a direction towards and/or away from a contour. Hence, the pointer movement is dampened based on an orientation of the contour. Therefore, whereas the pointer movement would otherwise result in a second position that is nearer to and/or further away from the contour, the pointer movement is now dampened such that a third position is established which is less near to and/or less far away from the contour.

The invention is partially based on the recognition that it is generally difficult for a user to follow a contour in the image, or follow the contour at a given distance, using a pointing device. Following the contour and following the contour at a distance, i.e., parallel to the contour, is henceforth commonly referred to as following the contour. Such following of the contour may be highly relevant, e.g., when drawing a line around an object, pointing out features along the contour, visually inspecting the contour by viewing a zoomed-in view based on the position of the pointer, etc. When moving the pointer towards a second position along the contour in the image, the user may therefore frequently move the pointer to a second position that is further away from, or nearer to, the contour. Disadvantageously, a significant amount of concentration is needed to accurately follow the contour by using the pointer. Also disadvantageously, the user makes errors in establishing the second position. The inventors have also recognized that it is undesirable to restrict the pointer movement to following the contour. A reason for this is that the user may not always need to follow the contour. Moreover, when the dampening is based on detection of the contour by the system, such detection may be wrong, resulting in following a wrongly detected contour.

By dampening the movement of the pointer in a direction perpendicular to the direction of the contour, a third position is established that better follows the contour than the second position. At the same time, however, the user is not restricted to following the contour, as he may still move towards or away from the contour, albeit with more effort, e.g., requiring more or longer movement of the pointing device. Advantageously, less concentration is needed to accurately follow the contour. Also advantageously, the user may more conveniently establish a third position that follows the contour in the image.

Optionally, the output is arranged for displaying the pointer at the third position in the image. The user is therefore shown a dampened movement of the pointer. Advantageously, the user perceives the pointer as stabilized, i.e., more stable, when it follows the contour in the image. Additionally or alternatively, the user perceives the sensitivity of the pointer to be higher when it follows the contour than when it deviates from the contour. Therefore, the user may more conveniently follow the contour with the pointer.

Optionally, the processor is arranged for processing the image based on the first position and the third position. Hence, the image is processed in accordance with the dampened pointer movement. Image processing which is based on the pointer movement therefore benefits from the dampening of the pointer movement.

Optionally, processing the image comprises drawing a line in the image between the first position and the third position. A line is thus obtained that is drawn between the first position and the third position. Therefore, the line better follows the contour as compared to a line drawn between the first position and the second position. Advantageously, the user can more accurately draw a line that follows the contour. Advantageously, the user can draw a line that is less wiggly than would be possible without the dampened pointer movement.

Optionally, the processor is arranged for establishing the third position by maximizing a similarity feature between image data at the first position and further image data located along the direction orthogonal to the contour from the second position. By maximizing a similarity feature between the image data at the first position and further image data located at the second position and along the direction orthogonal to the contour, the third position is established at a point towards or away from the contour where further image data most resembles the image data at the first position. Hence, at a plurality of positions starting from the second position, the image data is compared with further image data at said positions, and one of the positions is selected at which the further image data maximizes the similarity feature. Said measures provide an implicit following of a contour, since, when the image data at the first position shows a part of an image gradient, a third position is established which shows a similar part of an image gradient. Similarly, when the image data at the first position shows a part of an edge at a given distance, a third position is established which shows a similar part of an edge at a similar distance. It is noted that, here, image data refers to pixels or voxels at a given position, possibly including pixels and voxels near said position, e.g., within the neighborhood of said position. Advantageously, a contour may be followed without a need for explicitly detecting the contour in the image. Advantageously, errors associated with wrongly detecting a contour in the image are avoided.

Optionally, the processor is arranged for determining the contour in the image within the neighborhood of the first position. Hence, the processor explicitly establishes the contour in the image, e.g., by detecting an object edge within the image or receiving contour data. The processor determines the contour within the neighborhood of the first position. The contour is therefore located at a limited distance from the first position of the pointer.

Optionally, the processor is arranged for dampening the pointer movement based on whether the pointer movement in the direction orthogonal to the contour is towards or away from the contour. The dampening is thus different, i.e., the pointer movement is differently reduced, in the direction towards and the direction away from the contour.

Optionally, when said pointer movement is away from the contour, the processor is arranged for reducing said pointer movement more than when said pointer movement is towards the contour. It is therefore easier to deviate from following the contour in a direction towards the contour than in a direction away from the contour. Moving the pointer towards the contour typically improves the following of the contour. Moving the pointer away from the contour typically worsens the following of the contour. Advantageously, the user may easily move the pointer along and towards the contour, but not further away from the contour.

Optionally, the processor is arranged for dampening the pointer movement by decomposing a vector indicative of the pointer movement in a direction parallel to the contour and in the direction orthogonal to the contour for reducing a size of a component of the vector along the direction orthogonal to the contour. Vector decomposition is well suited for establishing the part of the pointer movement along the direction orthogonal to the contour.

Optionally, the processor is arranged for (i) determining a gradient based on the contour, (ii) determining an orthogonal gradient based on the gradient, the orthogonal gradient being orthogonal to the gradient, and (iii) decomposing the vector along the gradient and the orthogonal gradient for reducing a component of the vector along the gradient. The use of a gradient is well suited for obtaining the direction orthogonal to the contour, as the gradient typically points in a direction that is orthogonal to the contour direction.

Optionally, the output is arranged for displaying a user interface for enabling the user to provide an adjustment of said dampening, and the processor is arranged for performing said dampening based on the adjustment.

Optionally, the image is a medical image having associated anatomical data, and the processor is arranged for dampening the pointer movement further, based on the anatomical data. Anatomical data is thus used to further control the dampening of the pointer movement. Advantageously, the anatomical data may indicate, e.g., a nearby contour, a direction of the contour, whether dampening is needed, how strong the dampening is, etc.

Optionally, the processor is arranged for determining the gradient by (i) detecting a plurality of edges within the neighborhood of the first position, (ii) calculating a distance map based on the plurality of edges and the first position, and (iii) obtaining the gradient at the first position based on the distance map.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. two-dimensional (2-D), three-dimensional (3-D) or four-dimensional (4-D) images. A dimension of the multi-dimensional image data may relate to time. For example, a three-dimensional image may comprise a time domain series of two-dimensional images. The image may be a medical image, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). However, the image may also be of any other type, e.g., a cartographic or seismic image which the user wishes to annotate.

BRIEF DESCRIPTION OF THE DRAWINGS

These and other aspects of the invention are apparent from and will be elucidated with reference to the embodiments described hereinafter. In the drawings, FIG. 1 shows a system according to the present invention, and a display;

FIG. 2 shows a method according to the present invention;

FIG. 3 shows a computer program product according to the present invention;

DETAILED DESCRIPTION OF EMBODIMENTS

Figure 4:
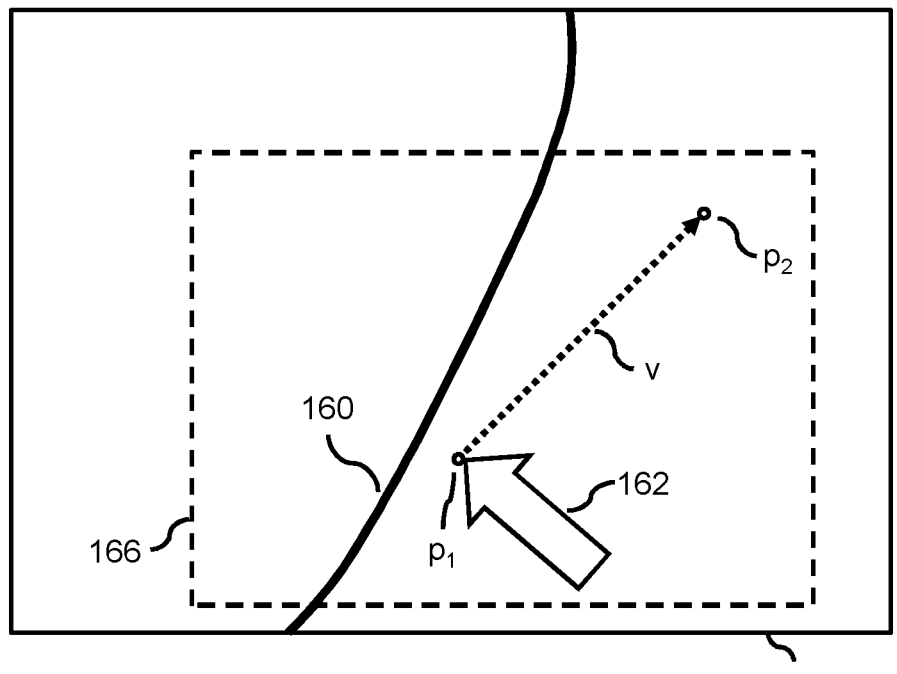
FIG. 4 shows a pointer near a contour in an image, with a pointer movement from a first position to a second position in the image being schematically indicated.

FIG. 1 shows a system 100 for real-time processing of a pointer movement provided by a pointing device 140. The system 100 comprises an output 130 for displaying a pointer 162 at a first position in an image 152. For that purpose, the output 130 is shown to be connected to a display 150. The display 150 may, but does not have to be part of the system 100. The output 130 is shown to provide display data 132 to the display 150 for said displaying of the pointer 162 in the image 152. The system 100 further comprises a user input 110 for obtaining pointer movement data 112 from a pointing device 140 operable by a user. The pointer movement data 112 is indicative of a pointer movement of the pointer 162 from the first position to a second position in the image 152. The pointing device 140 is shown to be a computer mouse. However, it will be appreciated that any other type of pointing device 140, such as a touch screen, gaze tracker, stylus, etc., may be advantageously used.

The system 100 comprises a processor 120. The processor 120 is shown to be connected to the user input 110 for receiving the pointer movement data 112 from the user input 110. Moreover, the processor 120 is shown to be connected to the output 130 for providing output data 122 to the output 130. The output data 122 may, but do not have to be equal to the display data 132. The output data 122 is at least indicative of a position of the pointer. The processor 120 is arranged for (i) dampening the pointer movement by reducing the pointer movement along a direction orthogonal to a contour 160 in the image, and (ii) establishing a third position of the pointer 162 based on said dampened pointer movement.

FIG. 2 shows a method 200 for real-time processing of a pointer movement provided by a pointing device. The method 200 comprises, in a first step titled "DISPLAY POINTER AT FIRST POSITION", displaying 210 a pointer at a first position in an image, the image comprising a contour. The method 200 further comprises, in a second step titled "OBTAINING POINTER MOVEMENT DATA", obtaining 220 pointer movement data from a pointing device operable by a user, the pointer movement data being indicative of a pointer movement of the pointer from the first position to a second position in the image. The method 200 further comprises, in a third step titled "DAMPENING THE POINTER MOVEMENT BASED ON THE CONTOUR", dampening 230 the pointer movement by reducing the pointer movement along a direction orthogonal to the contour. The method 200 further comprises, in a fourth step titled "ESTABLISHING THIRD POSITION BASED ON DAMPENED MOVEMENT", establishing 240 a third position of the pointer based on said dampened pointer movement. The method 200 may correspond to an operation of the system 100, and will be further explained in reference to the system 100. It will be appreciated, however, that the method may be performed in separation from said system.

FIG. 3 shows a computer program product 260 comprising instructions for causing a processor system to perform the method according to the present invention. The computer program product 260 may be comprised on a computer readable medium 250, for example in the form of a series of machine readable physical marks and/or a series of elements having different electrical, e.g., magnetic, or optical properties or values.

FIG. 4 and further figures illustrate an operation of the system 100 based on, for the sake of explanation, a zoomed-in view of the image 152. Here, a pointer 162 is displayed in the image 152. The pointer 162 is shown as an arrow but may equally be a crosshair or any other suitable graphical representation. The pointer 162 is shown to be positioned at a first position $p_1$, i.e., the tip of the arrow is located at the first position $p_1$. Also shown is a second position $p_2$, which corresponds to a pointer movement v of the pointer 162 away from the first position $p_1$, leading to the second position $p_2$. The pointer movement v is schematically illustrated by means of a dashed line in FIG. 4. The pointer movement v may constitute, or be interpreted as, a vector v. The image 152 further shows a contour 160. The contour 160 may be an object edge, i.e., an edge between an object and a background. However, the contour 160 may equally be a texture edge or line along an image gradient.

As part of the operation of the system 100, the contour 160 may be determined, by the system, to be within the neighborhood 166 of the first position $p_1$. Determining the contour 160 may comprise performing edge detection within the neighborhood 166 or the entire image 152. For that purpose, various techniques from the field of image processing may be advantageously used. Alternatively or additionally, determining the contour 160 may comprise obtaining contour data indicative of the contour 60. The contour data may be obtained from a previously performed contour detection. Alternatively, the contour 160 may be defined by contour data within the system, e.g., in case the contour 160 is a vector-based contour. Here, the contour 160 may be determined directly from the contour data, e.g., from coordinates of the start, intermediate and end points. The contour 160 may be a closest contour to the first position $p_1$, or a closest contour having a certain strength.

The neighborhood 166 is shown to be a rectangular neighborhood. However, any other suitable shape may equally be used. Moreover, the neighborhood 166 may be an explicitly defined neighborhood, e.g., defined by a width and a height, or may be an implicit defined neighborhood, e.g., being the result of the edge detection or of a search algorithm being limited to a certain distance from the first position $p_1$ in the image 152. In the latter case, edge detection may be performed on the entire image 152, with an edge selection algorithm then selecting a contour 160 nearest to the first position $p_1$ based on the edge detection.

Figure 5:
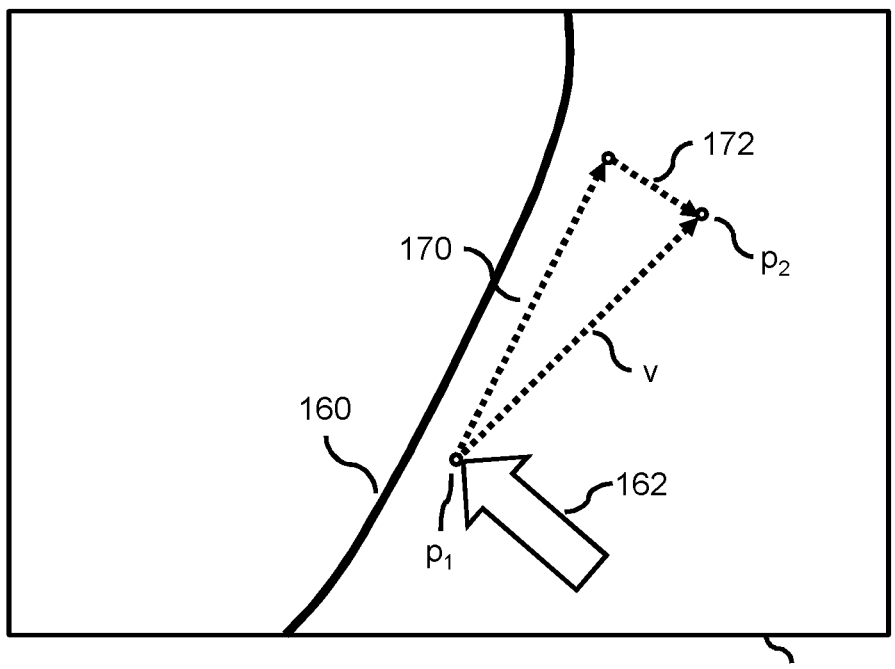
FIG. 5 shows a decomposition of the pointer movement in a direction along the contour and in a direction orthogonal to the contour.

FIG. 5 shows a result of the pointer movement v being decomposed in a direction 170 that follows the contour 160, i.e., runs in parallel with the contour 160, and a direction 172 that is orthogonal to the contour 160. It is noted here that said directions 170, 172 are shown as dashed lines having a length that corresponds to the pointer movement constituting a vector v, a decomposition of the vector v yielding vector components in the aforementioned directions, and the length of the arrows then being indicative of a size of the vector components. Consequently, the sum of the individual vectors represented by said vector components yields the pointer movement v. FIG. 5 shows the pointer movement v predominantly following the contour 160 and, to a lesser extent, moving away from the contour 160, as shown in FIG. 5 by the line 170 being more than twice as long as the line 172.

Figure 6:
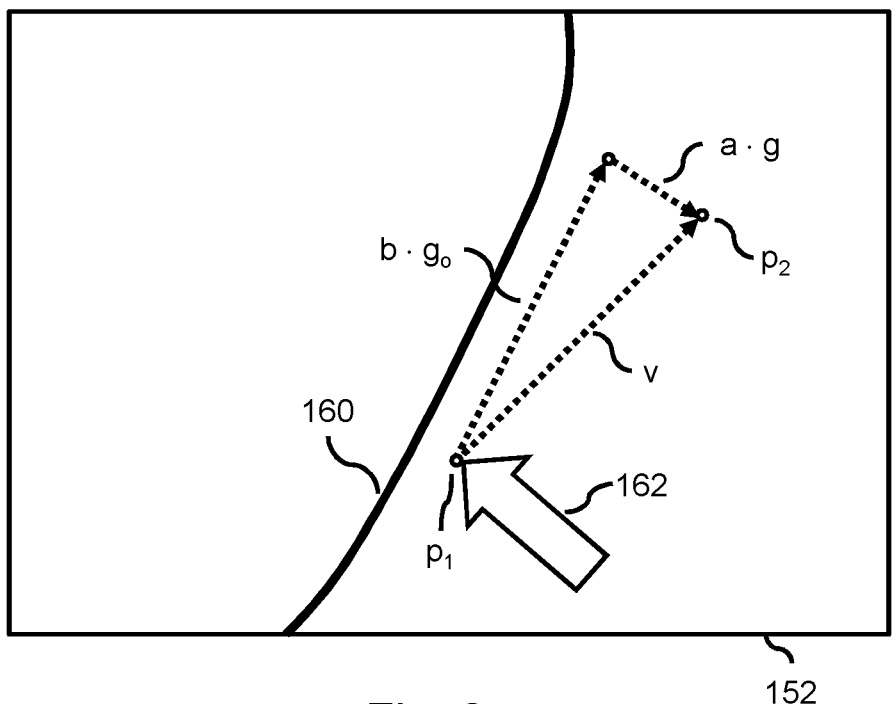
FIG. 6 shows the decomposition based on a gradient of the contour.

FIG. 6 corresponds to FIG. 5, with the exception that the lines 170 and 172 are now referred to by the results of the vector decomposition. The vector decomposition may be as follows. A gradient g is determined at the first position $p_1$. The gradient is a vector that points in the direction of the largest change in the image. The direction may be that of the largest pixel change, i.e., the largest change in luminance and/or chrominance value of spatially adjacent pixels. As a result, a gradient at a position on the contour 160 will typically be directed away from the contour 160 in a direction orthogonal to the contour. The gradient g at the first position $p_1$ will typically, by virtue of $p_1$ being located near the contour 160, point also in the direction orthogonal to the contour. Based on the gradient g, an orthogonal gradient $g_o$ is determined. The pointer movement, constituting a vector v, may then be represented in a basis formed by the gradient g and the orthogonal gradient $g_o$, resulting in $v=a \cdot g+b \cdot g_o$, with values a and b corresponding to the vector components of the vector v in said basis. It will be appreciated that the above vector decomposition may be calculated using any known technique from the field of linear algebra. As a result, the value a indicates the size of the pointer movement away from the contour, whereas the value b indicates the size of the pointer movement following the contour. FIG. 6 shows the resulting vectors $a \cdot g$ and $b \cdot g_o$, which, when summed together, correspond to the vector v, i.e., the pointer movement v.

For obtaining the gradient g at the first position $p_1$, a gradient field may be calculated for the neighborhood 166. Calculating the gradient field may comprise detecting a plurality of edges within the neighborhood 166, e.g., by performing edge detection with said neighborhood 166. Then, a distance map may be calculated based on the plurality of edges and the first position $p_1$, with the distance map being indicative of the distance between each of the plurality of edges and the first position $p_1$. Lastly, the gradient g may be obtained by calculating said gradient at the first position $p_1$ in the distance map. It is noted that various techniques from the fields of image processing and linear algebra may be advantageously used for calculating the gradient based on the distance map. In general, the calculation of the gradient g may comprise the use of discrete differentiation operators such as Sobel operators, as known from the aforementioned field of image processing. Moreover, the distance map may be pre-computed, avoiding the need to detect edges and calculating, based thereon, the distance map while the user moves the pointer in the image.

Figure 7:
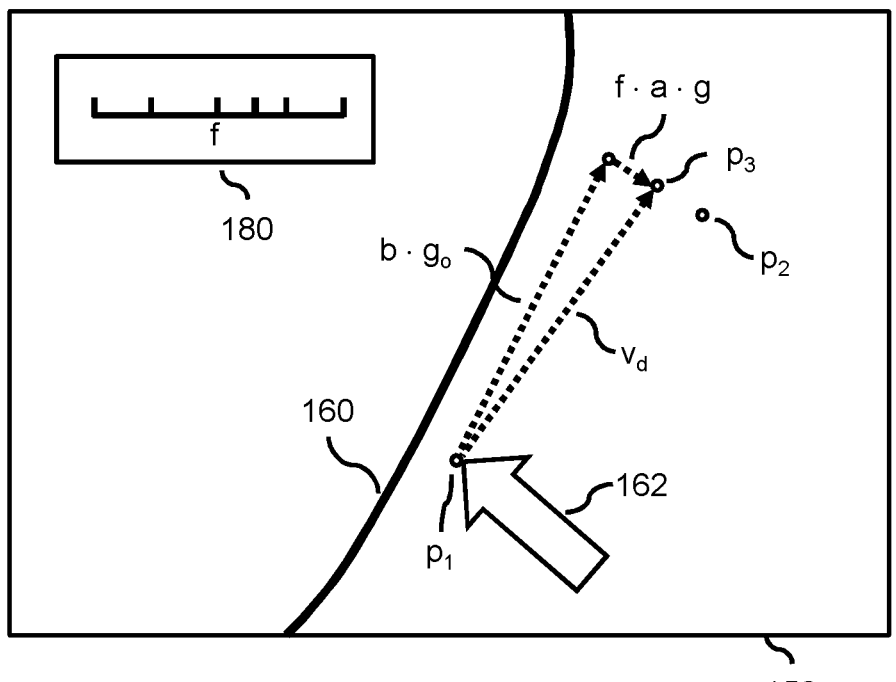
FIG. 7 shows a dampened pointer movement and a third position of the pointer based on the dampened pointer movement.

FIG. 7 shows a result of dampening of the pointer movement by reducing the pointer movement along the direction orthogonal to the contour 160. Here, the vector component a of the vector v is dampened by a dampening factor f, whereas the vector component b of the vector b is not dampened. As a result, a vector $v_d=f \cdot a \cdot g+b \cdot g_o$ is obtained, corresponding to the dampened pointer movement. The dampening factor f is smaller than one, resulting in the pointer movement along the direction orthogonal to the contour 160 being reduced. In the example of FIG. 7, the dampening factor f is chosen to be approximately 0.5. Hence, the pointer movement along the direction orthogonal to the contour 160 is reduced by approximately a factor of 2. FIG. 7 shows a third position $p_3$, which is established based on said dampened pointer movement $v_d$. The third position $p_3$ corresponds to the dampened pointer movement $v_d$ of the pointer 162 away from the first position $p_1$, leading to the third position $p_3$. The third position $p_3$ may be established by adding the vector $v_d$ to the first position $p_1$. As a result of the dampening of the pointer movement, the third position $p_3$ is located nearer to the contour 160 than the second position $p_2$.

FIG. 7 further shows a user interface 180 for enabling the user to adjust the dampening. The user interface 180 may, for example, enable the user to set the dampening factor f by sliding a slider on a numerical scale. As a result, the system 100 may perform the dampening in accordance with said selection of the user, i.e., with the selected dampening factor f. It is noted that many different user interfaces 180 may be advantageous used. For example, the user interface 180 may provide a selection menu enabling the user to select, e.g., a 'weak', 'medium' or 'strong' dampening, with the system 100 establishing dampening parameters, e.g., the dampening factor f, that correspond to said selection.

Figure 8:
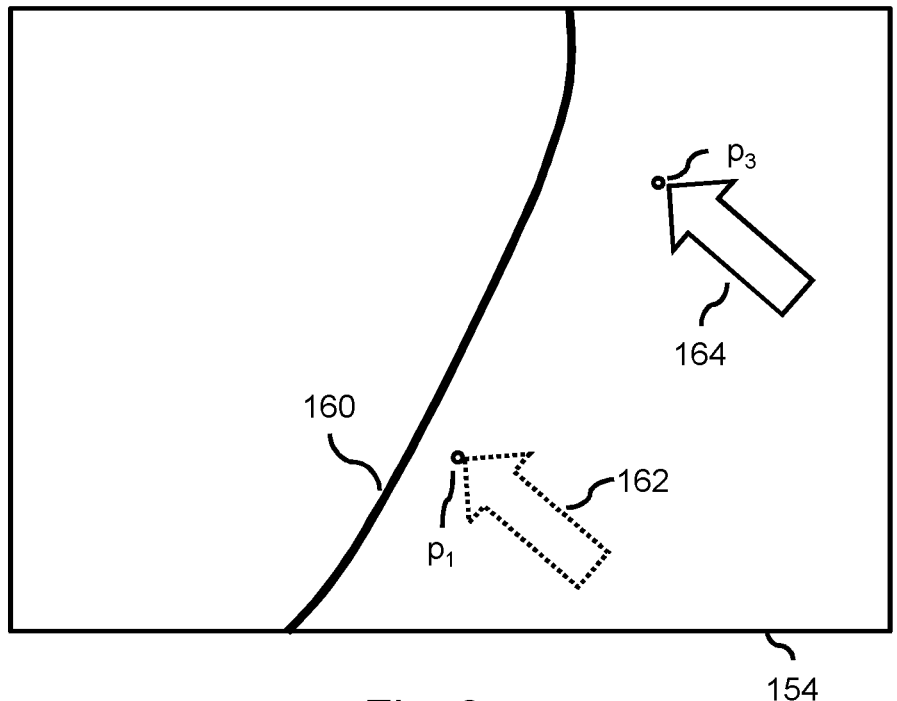
FIG. 8 shows the pointer being displayed based on the dampened pointer movement.

FIG. 8 shows a result of the pointer 164 being displayed at the third position $p_3$ in the image 154. For the sake of explanation, the pointer 162 at the previous position $p_1$ is shown having a dashed outline to indicate that the pointer 162 used to be located there. In practice, however, the pointer 164 at the third position $p_3$ corresponds to an update of the position of the pointer 162, with the pointer 164 thus being displayed only at the third position $p_3$. The system 100 may be arranged for continuously receiving pointer movement data from the pointing device, e.g., in millisecond-based intervals, and then continuously updating the position of the pointer 164 in the image 154 based on a dampened pointer movement being calculated for each of the pointer movement data. Therefore, the movement of the pointer 164 as shown to the user corresponds to the dampened pointer movement.

Figure 9:
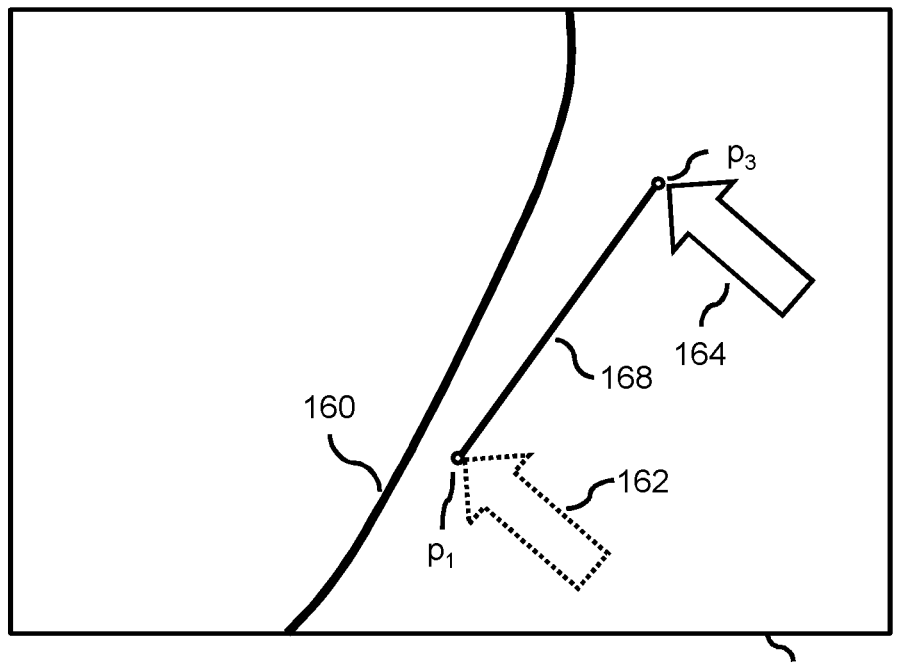
FIG. 9 shows a contour drawn based on the dampened pointer movement.

Additionally, the image may be processed based on the first position $p_1$ and the third position $p_3$. For example, an image segmentation may be performed with the first position $p_1$ and the third position $p_3$ providing an initialization of the image segmentation. FIG. 9 shows an example in which the processing of the image 156 comprises drawing a contour 168 in the image 156 between the first position $p_1$ and the third position $p_3$. Here also, the system 100 may be arranged for continuously receiving pointer movement data from the pointing device, e.g., in millisecond-based intervals, and then drawing the contour 168 in the image 156 based on a dampened pointer movement being calculated for each of the pointer movement data. It is noted that the position of the pointer 164 may be updated together with the image processing being performed based on the third position $p_3$. Alternatively, only the image processing may be performed, i.e., without displaying the pointer 164 at the third position $p_3$. This may be desirable, e.g., when the dampening is only needed for the image processing, or when it is desirable not to display the pointer during the image processing. For example, when drawing a contour, the pointer may not be shown, since the end of the contour, as it is being drawn, may already effectively serve as a pointer.

Figure 10:
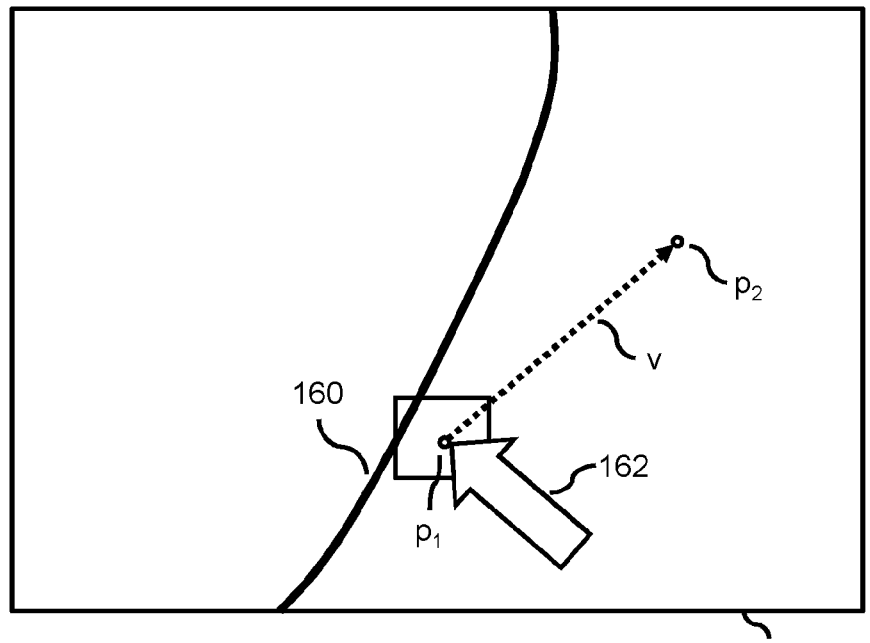
FIG. 10 shows again the pointer near the contour in the image.
Figure 11:
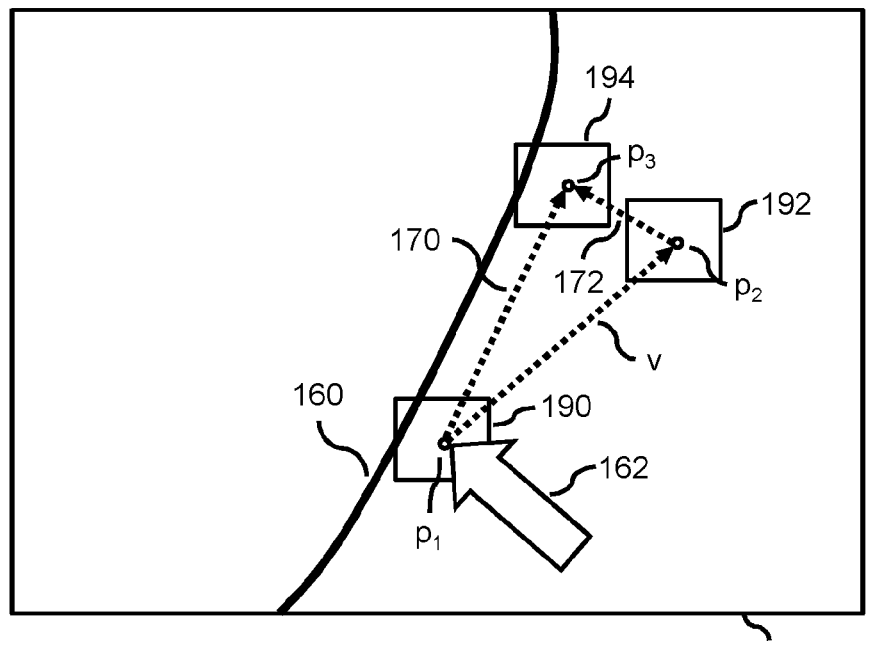
FIG. 11 shows an instance of dampening based on maximizing a similarity measure.

FIGS. 10 and 11 illustrate an operation of the system 100 in which the contour 160 is not explicitly determined by the system 100. In this case, the processor 120 may be arranged for establishing the third position $p_3$ by maximizing a similarity feature between image data 190 at the first position $p_1$ and further image data 192, 194 located along the direction orthogonal 172 to the contour 160, starting at the second position $p_2$. As a similarity feature, various techniques from the field of image processing may be advantageously used. A basic example is the calculation of a Sum of Absolute Differences (SAD) between pixels in a block 190 centered on the first position $p_1$ and corresponding pixels in blocks 192, 194 along the direction orthogonal 172 to the contour 160, from the second position $p_2$. For example, a first SAD may be calculated between the block 190 at the first position $p_1$ and the block at the second position $p_2$, as well as multiple blocks further along said direction. For the sake of clarity, FIG. 11 only shows the block at a position $p_3$ which minimizes the similarity feature, i.e., yields a lowest SAD. Hence, said position is established as the third position $p_3$. It will be appreciated that instead of, or in addition to, the SAD, many other techniques may be advantageously used. In particular, the similarity feature may emphasize edges or contours in the image data. Also, the similarity feature may incorporate a distance-dependent penalty to avoid deviating too much from the second position $p_2$. Alternatively, or additionally, the maximizing of the similarity feature may be constrained to a given distance from or neighborhood of the second position $p_2$. The distance-dependent penalty or the limitation to a given distance or neighborhood may constitute a dampening factor, i.e., determine a magnitude of the dampening, and thus have a similar functionality as the earlier mentioned dampening factor f as referred to in the description of FIG. 7.

In general, the dampening may be based on a constant dampening factor or a user-selectable dampening factor. Alternatively or additionally, the dampening may be adaptive. For example, the dampening of the pointer movement may be based on whether the pointer movement in the direction orthogonal to the contour is towards or away from the contour. Therefore, when the pointer movement is away from the contour, the dampening may be stronger, i.e., said pointer movement may be more reduced than when said pointer movement is towards the contour. This may allow the user to follow a contour directly and more easily, i.e., move the pointer on top of the contour. Said dampening may also be reversed, i.e., the dampening may be stronger when the pointer movement is towards the contour. This may allow the user to stay clear of contours more easily. In case the image is a medical image, the dampening may be based on anatomical data associated with the medical image. The anatomical data may determine the dampening, e.g., the dampening factor f, based on an anatomical context of the first position $p_1$. For example, in an area where contours are known to constitute contours of organs, the dampening may be stronger than in an area where contours are known to constitute texture edges of the organs. As a result, the user may freely move the pointer within an organ, with the dampening only being provided around organ boundaries. Similarly, the dampening may be based on general metadata associated with an image, i.e., data that is neither anatomical data nor a medical image. For example, knowledge about the shape of an object in the image may be used to dampen the pointer movement while the user draws a line, i.e., a straight line or a curve, around the object.

It will be appreciated that the invention may be advantageously used in the medical domain, e.g., for interactive segmentation of organs at risk or target volumes in radio therapy treatment planning, tumor and organ delineation in oncology diagnosis, bone delineations in X-ray, etc. However, the invention may also be used in non-medical image processing, such as manual photo editing using an image processing software package.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for real-time processing of a pointer movement provided by a pointing device, the system comprising:
    an output for displaying a pointer at a first position in an image, the image comprising a contour;
    a user input for obtaining pointer movement data from a pointing device operable by a user, the pointer movement data being indicative of a pointer movement of the pointer from the first position to a second position in the image; and
    a processor programmed to perform operations including (i) dampening the pointer movement by reducing the pointer movement along a direction orthogonal to the contour by decomposing a vector indicative of the pointer movement, in a direction parallel to the contour and in the direction orthogonal to the contour and reducing a size of a component of the vector along the direction orthogonal to the contour, and (ii) establishing a third position of the pointer based on said dampened pointer movement.

2. The system according to claim 1, wherein the output is arranged for displaying the pointer at the third position in the image.

3. The system according to claim 1, wherein the processor is further programmed to process the image based on the first position and the third position.

4. The system according to claim 3, wherein processing the image comprises drawing a line in the image between the first position and the third position.

5. A system for real-time processing of a pointer movement, provided by a pointing device, the system comprising:
    an output for displaying a pointer at a first position in an image, the image comprising a contour;
    a user input for obtaining pointer movement data from a pointing device operable by a user, the pointer movement data being indicative of a pointer movement of the pointer from the first position to a second position in the image; and
    a processor programmed to perform operations including (i) dampening the pointer movement by reducing the pointer movement along a direction orthogonal to the contour, and (ii) establishing a third position of the pointer based on said dampened pointer movement by maximizing a similarity feature between image data at the first position and further image data located along the direction orthogonal to the contour from the second position.

6. The system according to claim 1, wherein the processor is programmed to perform the further operation of determining the contour in the image within the neighborhood of the first position.

7. The system according to claim 6, wherein the processor is programmed to perform the dampening of the pointer movement based on whether the pointer movement in the direction orthogonal to the contour is towards or away from the contour.

8. The system according to claim 7, wherein the processor is programmed to perform the dampening by reducing, when said pointer movement is away from the contour, said pointer movement more than when said pointer movement is towards the contour.

9. The system according to claim 1, wherein the processor is programmed to perform the further operations of:
  determining a gradient based on the contour,
  determining an orthogonal gradient based on the gradient, the orthogonal gradient being orthogonal to the gradient, and
  (iii) decomposing the vector along the gradient and the orthogonal gradient for reducing the component of the vector along the gradient.

10. The system according to claim 1, wherein the output is arranged for displaying a user interface for enabling the user to provide an adjustment of said dampening, and wherein the processor is programmed to perform said dampening based on the adjustment.

11. The system according to claim 1, wherein the image is a medical image having associated anatomical data, and wherein the processor is programmed to perform the dampening of the pointer movement further based on the anatomical data.

12. A workstation or an imaging apparatus comprising:
  a pointing device;
  the system according to claim 1 with the user input of the system connected with the pointing device; and
  a display connected with the output of the system.

13. A method for real-time processing of a pointer movement provided by a pointing device, the method comprising:
  displaying a pointer at a first position in an image, the image comprising a contour;
  obtaining pointer movement data from a pointing device operable by a user, the pointer movement data being indicative of a pointer movement of the pointer from the first position to a second position in the image;
  dampening the pointer movement by decomposing a vector indicative of the pointer movement in a direction parallel to the contour and in a direction orthogonal to the contour and reducing the pointer movement along the direction orthogonal to the contour; and
  establishing a third position of the pointer based on said dampened pointer movement.

14. A computer program product comprising a non-transitory storage medium carrying instructions for causing a computer including a display and a pointing device to perform the method according to claim 13.

15. The workstation or an imaging apparatus of claim 12 wherein the pointing device is a computer mouse or stylus, a touch screen, or a gaze tracker.

16. The workstation or an imaging apparatus of claim 1 wherein the output is configured for connection with a display and the user input is configured for connection with a pointing device comprising at least one of a computer mouse or stylus, a touch screen, and a gaze tracker providing said pointer movement data.

17. The workstation or an imaging apparatus of claim 1 wherein the processor comprises a computer processor.

18. The workstation or an imaging apparatus of claim 5 wherein the output is configured for connection with a display and the user input is configured for connection with a pointing device comprising at least one of a computer mouse or stylus, a touch screen, and a gaze tracker providing said pointer movement data.

19. The workstation or an imaging apparatus of claim 5 wherein the processor comprises a computer processor.

* * * * *